United States Patent [19]

Uihlein et al.

[11] Patent Number: 5,345,563
[45] Date of Patent: Sep. 6, 1994

[54] INPUT/OUTPUT INTERFACE FOR DATA IN PARALLEL PROCESSORS

[75] Inventors: Christoph Uihlein; Michael Häusing, both of Überlingen; Andreas J. Pühler, Ludwigshafen, all of Fed. Rep. of Germany

[73] Assignee: Bodenseewert Geratetechnik GmbH, Bodensee, Fed. Rep. of Germany

[21] Appl. No.: 838,099

[22] Filed: Feb. 19, 1992

[30] Foreign Application Priority Data

Feb. 20, 1991 [DE] Fed. Rep. of Germany ....... 4105193

[51] Int. Cl.$^5$ ............................................. G06F 13/00
[52] U.S. Cl. ..................................................... 395/275
[58] Field of Search ................................. 395/200, 275

[56] References Cited

U.S. PATENT DOCUMENTS

| | | | |
|---|---|---|---|
| 3,911,409 | 10/1975 | Kowal | 395/275 |
| 4,254,473 | 3/1981 | Galdun et al. | 395/275 |
| 4,514,807 | 4/1985 | Nogi | 364/200 |

OTHER PUBLICATIONS

Kittler and Duff "Image Processing System Architectures", Research Studies Press Ltd., Letchworth, Herts, 1985 pp. 23–35.

*Primary Examiner*—Robert L. Richardson
*Attorney, Agent, or Firm*—Mallinckrodt & Mallinckrodt

[57] ABSTRACT

An input/output interface for converting between data patterns in bit-parallel and word-serial format and data patterns in word-parallel and bit-serial format. In combination with a parallel processor, the inputting and outputting rates of the data are to be increased. To this end, a three dimensionally organized memory with a three-dimensional addressing is connected to the input and/or to the output of the parallel processor. Each address is composed of three components, of which a first component represents the significance of a bit, the second component represents the running number of the word in a limited sequence of words, and the third component represents the running number of the sequence, to which the word belongs. A switching network for the control of the memory is associated with the memory. The memory is arranged to buffer an incoming data stream of bit-parallel and word-serial format. The data from the memory are applied to the parallel processor as bit-serial and word-parallel data pattern in the form of "bit planes" of identical bit addresses. Alternatively, the memory may serve to buffer a data stream provided by the parallel processor in bit-serial and word-parallel format as a sequence of "bit planes", the data being outputted as a bit-parallel and word-serial data pattern.

12 Claims, 11 Drawing Sheets

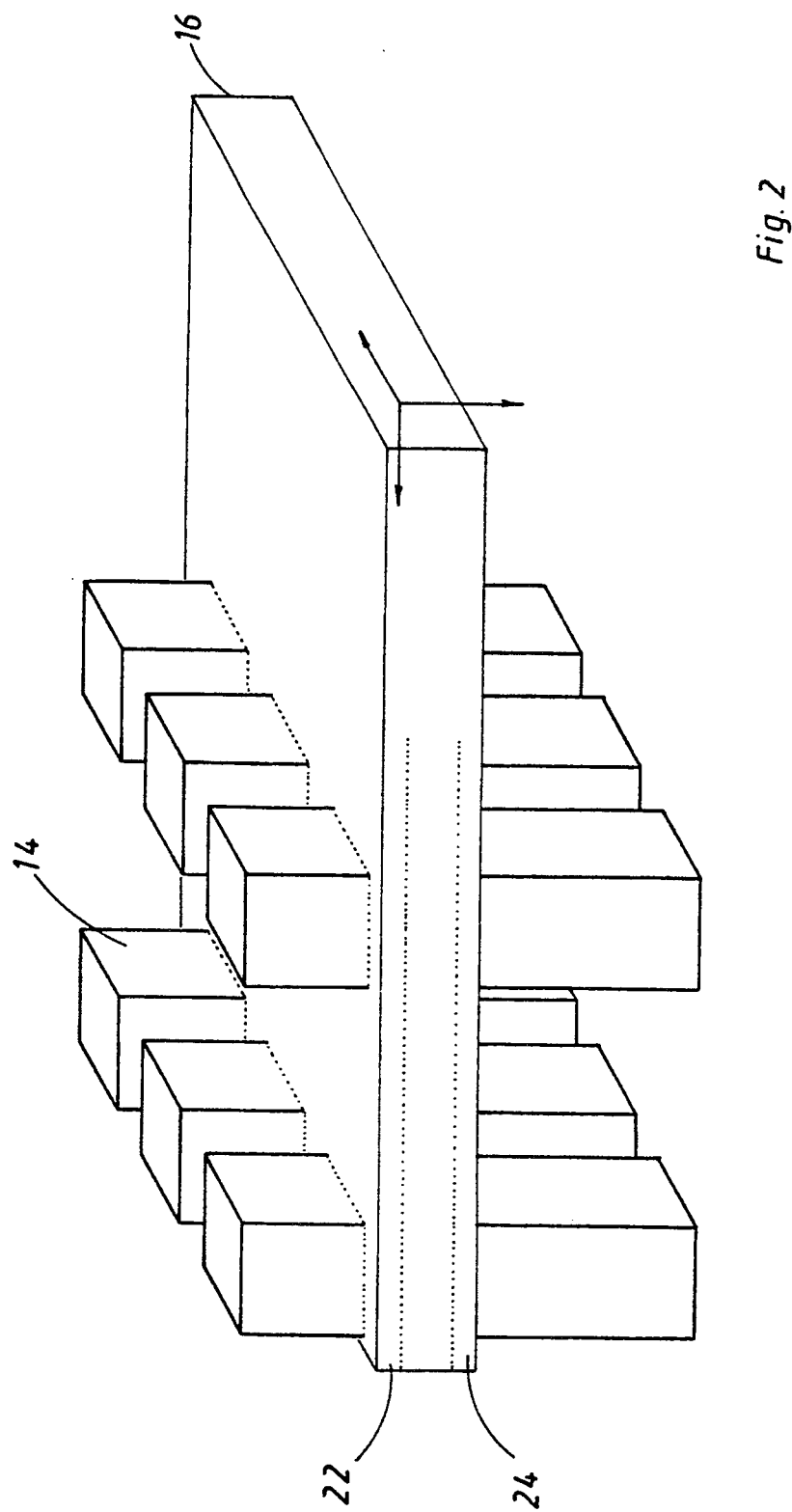

INPUT/OUTPUT INTERFACE FOR DATA IN PARALLEL PROCESSORS

The invention relates to an interface for converting bit-parallel and word-serial data patterns into bit-serial and word-parallel data patterns or vice versa, in combination with a parallel processor.

In particular, the invention relates to an interface for two-dimensionally networked parallel processors. Such two-dimensionally networked parallel processors are used for processing two-dimensional data structures. By associating, as a rule, one processor element with each word, and by executing all operations simultaneously and parallel in all processor elements, such two dimensional parallel processors permit high processing speeds. This high processing speed can, however, be made use of effectively only if the input and output of the data is effected correspondingly quickly.

During this input and output of the data, the data have to be reformatted. A bit-parallel, word-serial data stream is supplied to the processor. The data, such as digitized measured values, come in successively (word-serial). The bits of the individual data are available simultaneously (bit-parallel). The processor, however, processes all data simultaneously (word-parallel), but processes one bit only of each word during each clock cycle (bit-serial).

It is an object of the invention to provide an interface for parallel processors which permits, with minimum technical expenditure, quick input and/or output of data into and out of the parallel processor.

According to the invention, a three-dimensionally organized data memory is at the input and/or at the output of said parallel computer, each address in said data memory comprising three components, of which a first component represents the significance of a bit in a word, the second component representing the running number of said word in a limited sequence of words, and the third component representing the running number of said sequence. A switching network means for controlling said data memory is associated with said data memory. The data memory is arranged to buffer an incoming data stream formatted bit-parallel and word-serial, the data from said data memory being applied to said parallel computer as bit-serial and word-parallel data pattern in the form of "bit planes" having identical bit addresses, and/or to buffer a data stream provided by said parallel computer and formatted bit-serial and word-parallel as a sequence of "bit planes", and output data as a bit-parallel and word-serial data pattern.

A microprogram may be implemented in said switching net work means for addressing said data memory and for controlling data paths therein. Preferably the data memory comprises two partial memory areas, each of which has an associated switching network means. Each of these partial memory areas is adapted both to convert a bit-parallelly and word-serially formatted data stream into a word-parallel and bit-serial data pattern, and to convert a word-parallelly and bit-parallelly formatted data stream into a bit-parallel and word-parallel data pattern. In this case microprograms operating independently of each other are implemented in said switching network means associated with each of said two partial memory areas. The two microprograms are designed to operate at different data and clock rates.

"Three dimensionally organized" means that each storage cell is characterized by an address consisting of three components, of which each one can be addressed separately. These three components can be regarded as "coordinates" x,y,z, and, thereby, illustrate the events in the data memory plastically. As a rule, however, this has nothing to do with the actual arrangement of the storage cells in space. Accordingly, a "bit plane" is the totality of all storage elements in which bits of the same type, e.g. the least significant bits, of all data words are stored.

By providing two partial memory areas in the data memory with associated switching network means, it becomes possible to input data in a bit-parallel, word-serial data format into a first partial memory area and, simultaneously, to output data in a word-parallel, bit-serial data format from the second partial memory area into the parallel processor. By providing the two microprograms with different data and clock rates, it becomes possible to receive data with one partial memory area in bit-parallel, word-serial data format at a first data rate, and, simultaneously, to transfer data already reformatted with the second partial memory area to the parallel processor at a second data rate. It is also possible, with the data removal by one partial memory area, to receive data in word-parallel, bit-serial data format from the parallel processor at the second data rate, while simultaneously reformatted data are output with the other partial memory area in bit-parallel and word-serial format at a third data rate.

An embodiment of the invention will be described in greater detail hereinbelow with reference to the accompanying drawings.

FIG. 2 illustrates the data layers in the local RAMs of a parallel processor constructed as an array of processor elements.

FIG. 1 illustrates the general structure of an individual processor element in a parallel processor.

Figure 1:
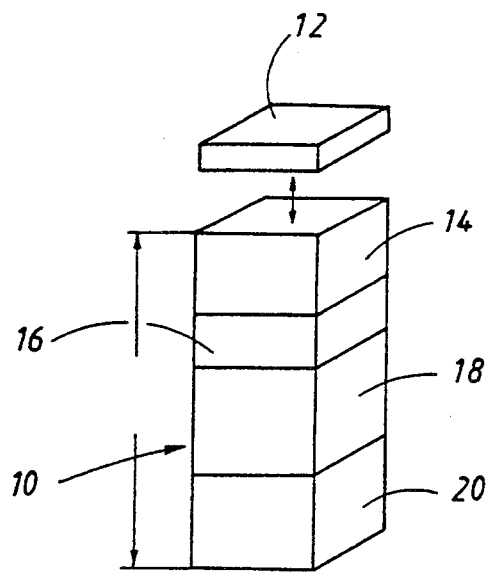
FIG. 1 illustrates the basic structure of an individual processor element in a parallel processor.

The processor element 10 contains a processor unit 12. The processor unit 12 is a 1-bit processor. The processor unit 12 is designed to process bit-serially operands of any length. The processor unit 12 contains an arithmetic and logic unit (ALU), register, communication register and communication data paths. "Underneath" there are local RAMs 14 for a total of two hundred and fiftysix bits. Data to be processed are arranged bitwise, vertically one above the other as layers 16, 18, 20 in the local RAM 14.

In an array of processor elements (FIG. 2), the data layers 16, 18, 20 define two-dimensional structures with bit planes 22 to 24. Each data layer, such as 16, has a "layer thickness", which is defined by the number of vertically offset storage elements in each RAM.

The vertical position of a stored bit determines the significance of the bit. In the two-dimensional structure, such as 22, of the data layers 16, this vertical position is supplemented by information about the "horizontal" position of the bit in the data layer 16.

Figure 3:
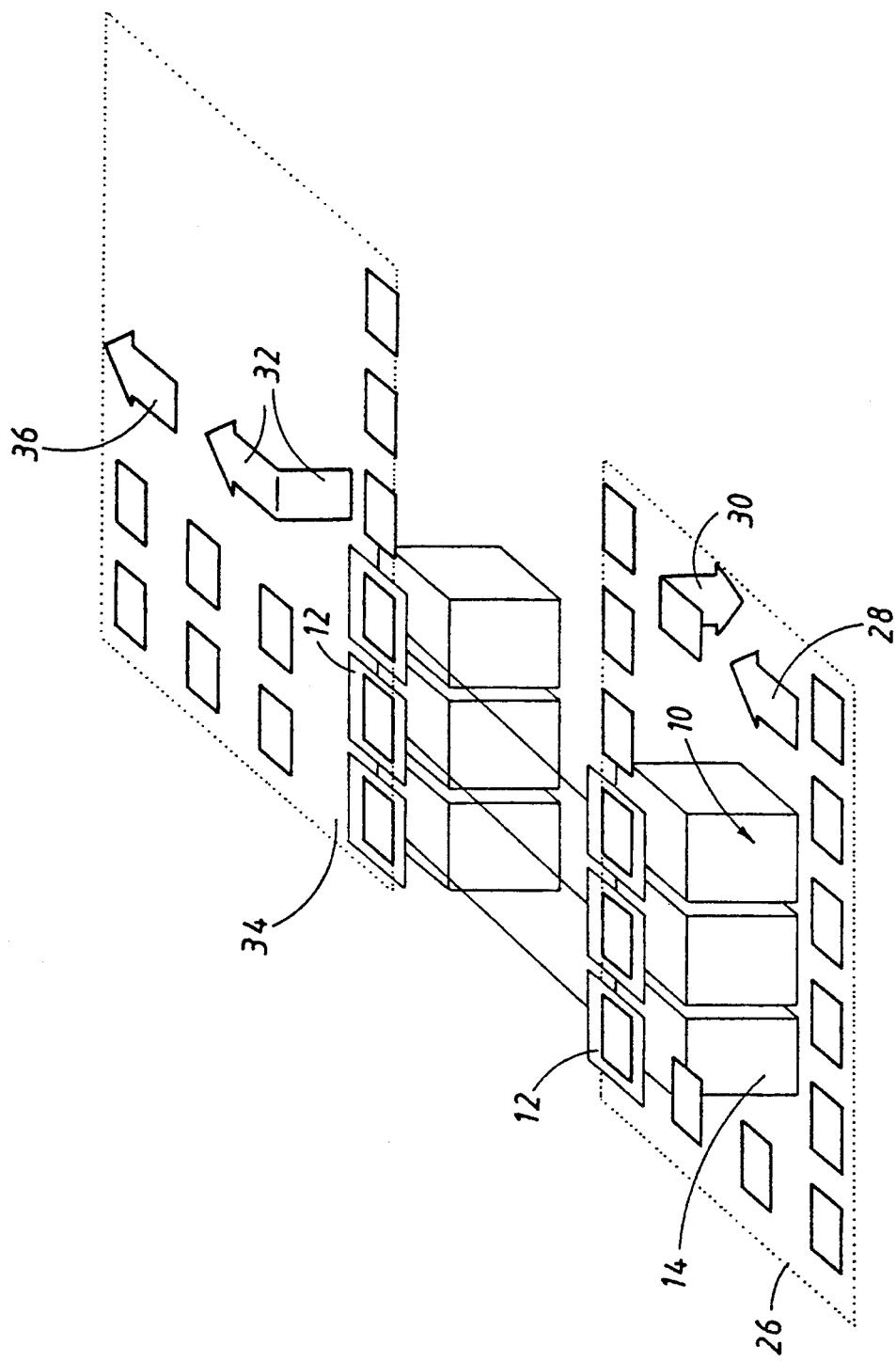
FIG. 3 illustrates the data structures in an array of processor elements during the input and output operations.

The supply of data to and the retrieval of data from these local RAMs 14 is effected by transfer of "bit planes". This is illustrated in FIG. 3. The processor elements have a special communication path for the retrieval and transfer of bit planes. This communication path can be occupied independently of running calculating operations.

When the data are input, the data of a bit plane 26 are, at first, loaded "horizontally", parallelly to the plane of an array of processor elements into the communication register of the array. This communication register of the array is composed of the communication registers in the processor units 12 of the individual processor elements 10 . This is indicated in the front portion of FIG. 3 by the arrow 28. When the bit plane has been correctly positioned in alignment with the processor elements 10, the bits are "lowered" into the respective storage cells of the local RAM. This is illustrated in FIG. 3 by arrow 30 bent off to the bottom. The data layer 16 is built up by successively and step-by-step transferring the various bit planes of this data layer "horizontally" into the communication register and then, again stepwise, lowering them into the RAMs 14 of the processor elements 10.

When the data are output, the reverse procedure is carried out: The data are stored in the "layers" 16, 18, 20 in the local RAMs 14 of the processor elements 10. These data are "lifted" bit plane-by-bit plane and are loaded into the communication register of the processor units 12. This is illustrated in FIG. 3 by arrow 32. The "lifted" bit plane 34, for example the bit plane containing the least significant bits of the various data, is then stepwise "shifted out horizontally" and is thereby output. This is illustrated in FIG. 3 by arrow 36.

A parallel processor of the type described is particularly adapted to process two-dimensional data structures. Such data structures are, for example, picture data. Sensors provide a brightness value for each picture element (pixel). These sensors are read out line-by-line. This results in a series of brightness values. These brightness values are digitized. The consecutively appearing digital brightness values form a data stream. In the data of this data stream, all bits of the digital brightness values are available simultaneously. The brightness values come in "bit-parallelly". During the line-by-line sampling, however, the brightness values of the different picture elements come in successively in time. Therefore the brightness values come in "word-serially". The problem is to reformat the data comming in bit-parallelly and word-serially such that they can be input into the parallel processor in the manner described.

Figure 4:
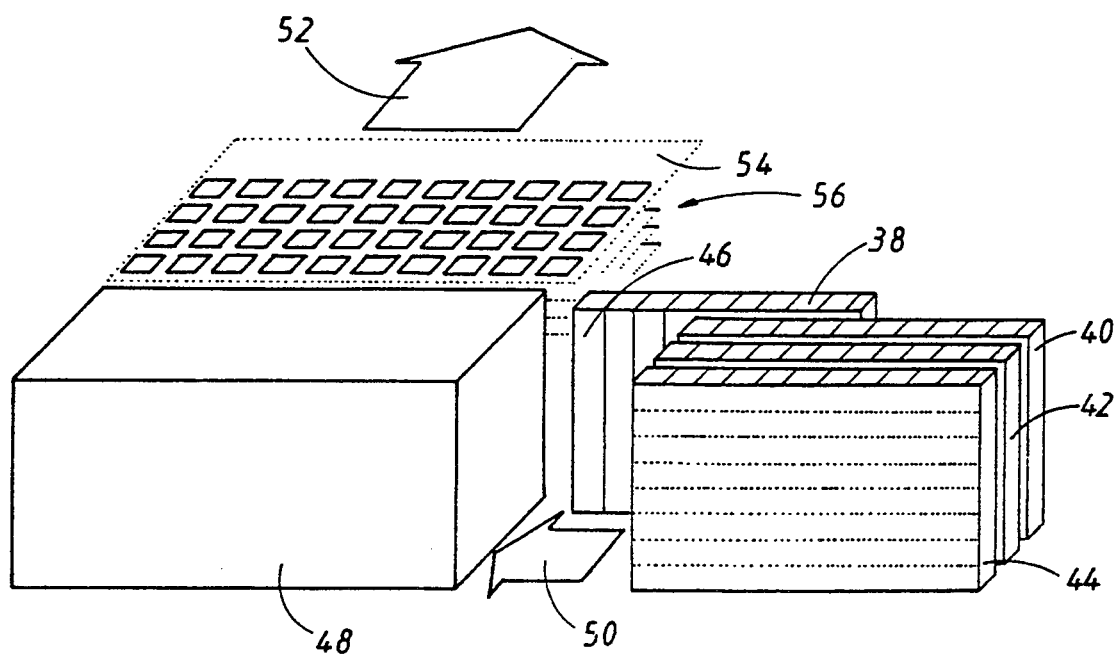
FIG. 4 illustrates the change of structure of the input data in an input/output interface from word-serially, bit-parallelly incoming data to "two-dimensional", word-parallel, bit-serial data.

This is schematically illustrated in FIG. 4. The data come in serially in rows 38, 40, 42, 44. Each word consists of a binary number having bits of different significances. This is illustrated in FIG. 4 by the vertical dimension. Each word is represented by a column. The bits of each word are available simultaneously, parallelly.

For inputting the data into the parallel processor, an input interface 48 is provided at the input of the parallel processor. This interface 48 comprises a three-dimensionally organized memory. "Three-dimensionally" organized means that the address of each storage cell has three components which can be individually addressed. These components can be said to represent three "dimensions". One of these dimensions is the significance of the respective bit. Another dimension can, for example, be the row 38, 40, 42 or 44. A further dimension represents the position of the word in the respective row. This can be shown plastically by a three-dimensional illustration as in FIG. 4. The data 46 are input serially row-by-row into the interface 48 with the three-dimensionally organized memory. This is shown by an arrow 52 in FIG. 4. Numeral 54 in FIG. 4 designates the bit plane with the least significant bits. "Underneath" are the bit planes 56 with the more significant bits.

Figure 5:
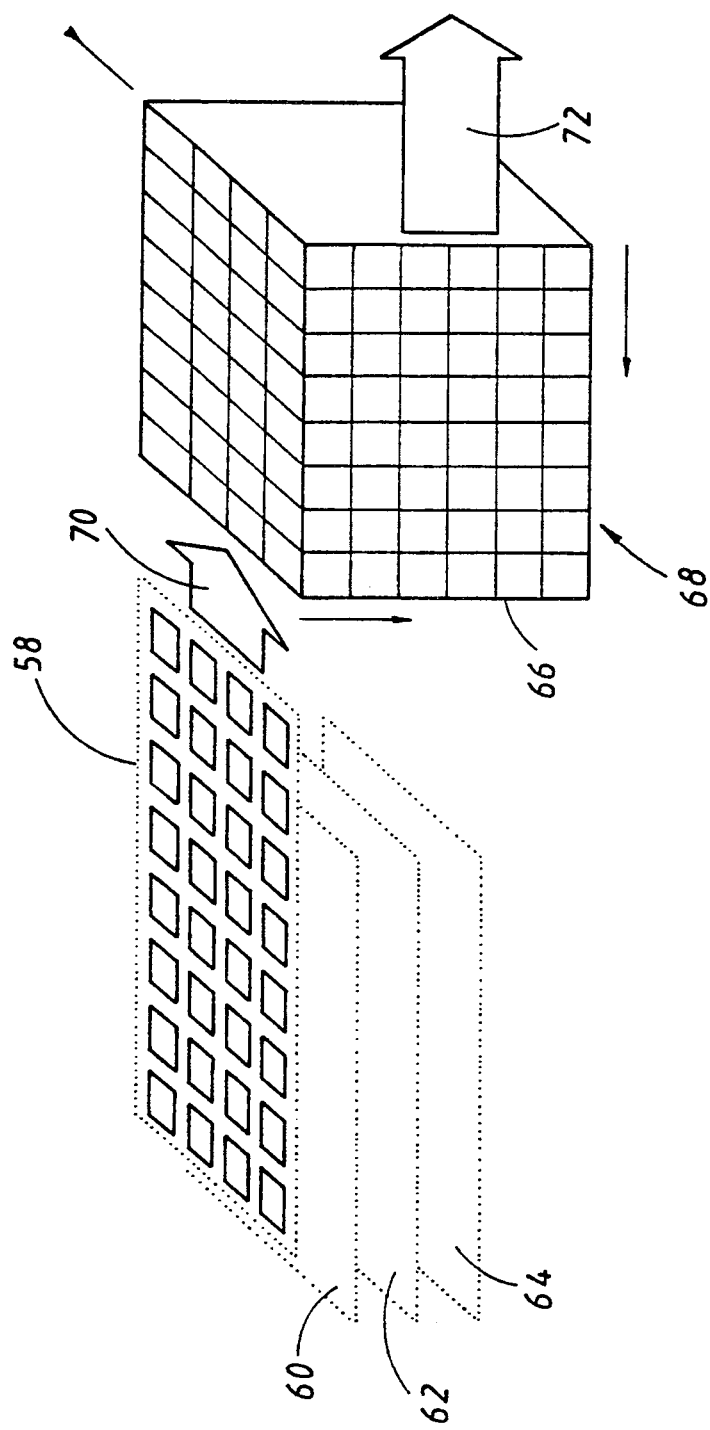
FIG. 5 illustrates the basic mode of operation of the input/output interface during the data output operation.

In a parallel processor, the results of the calculation present themselves in the form of data layers in the local RAMs 14 of the processor elements 10. Similar to the input operation, these data are output sequentially by successively transferring the individual bit planes into the interface. This is schematically illustrated in FIG. 5. It has been assumed, that the results are present in sixteen bit planes. Thus the operand length is sixteen bit.

The bit planes 58, 60, 62, 64 etc. are successively "lifted" from the RAMs 14 into the communication register and are transferred "horizontally" into a three-dimensionally organized memory 66 of an interface 68. This is illustrated in FIG. 5 by arrow 70. After all bit planes 58, 60, 62, 64 etc. have been transferred from the RAMs 14 of the processor elements 10 to the memory 66, the data are then output bit-parallelly and word-serially. This is represented in FIG. 5 by arrow 72.

The three-dimensionally organized memory 66 has as first "dimension", i.e. address component, x the significance of the bit, as second dimension y the position of the word in a row, and as third dimension z the number of the row.

For transferring a bit plane, the x-address, which represents the bit plane 58, 60, 62 or 64 of the memory, is maintained constant. The y-address is set to "0", corresponding to the first "vertical" layer of the memory 66. In the "z-direction", as many storage cells are enabled for writing as bit signals are presented by the parallel processor in this "z-direction". Then the bits of the first column of the bit plane 58 of the parallel processor are transferred parallelly to the "upper right"

column of the memory 66. Thus in FIG. 5, from bit plane 58, at first, the contents of the storage cells "0", "8", "16", "24" are transferrred to the respective storage cells of the memory 66. Then the y-address is increased stepwise to 1, 2, 3 etc. Each time the contents of the storage cells of one column are transferred to the respective storage cells, such as "1", "9", "17", "25", of the memory 58, until the whole contents of the bit plane 58 has been transferred to the uppermost plane of the memory 66.

When the bit plane 58 has been transferred completely into the memory 66, the bit plane 60 in the parallel processor is lifted into the communication register. At the same time, the x-address is increased by one. The y-address is reset to zero. In the manner described hereinbefore, now the contents of the second bit piano 60 of the parallel processor is transferred to top plane but one of the memory 66. By incrementing of the x-address and "lifting" of the bit planes of the parallel processor, successively all sixteen bit planes, in which the rsults of the calculating operations are stored, are transferred from the parallel processor to the memory. Then the data are again completely stored in the memory in the form of the "vertically" arranged bits.

Then the data are read out of the memory 66 bit-parallely and word-serially. To this end, at first, the z-address is reset to its initial value. Then all sixteen x-addresses are enabled for reading out parallelly. Then the y-addresses are increased incementally. In this way, at first, the "front, vertical" layer of the memory is read out from "right to left", as indicated by arrow 72. Thereafter, the z-address is increased by one, and the next layer is output. This results in a data stream of bit-parallely and word-serially outgoing 16-bit data. These data are handed over to a further processing stage.

A technical realization of the principle explained above is described in detail herinbelow with reference to FIGS. 6 to 13.

Figure 6:
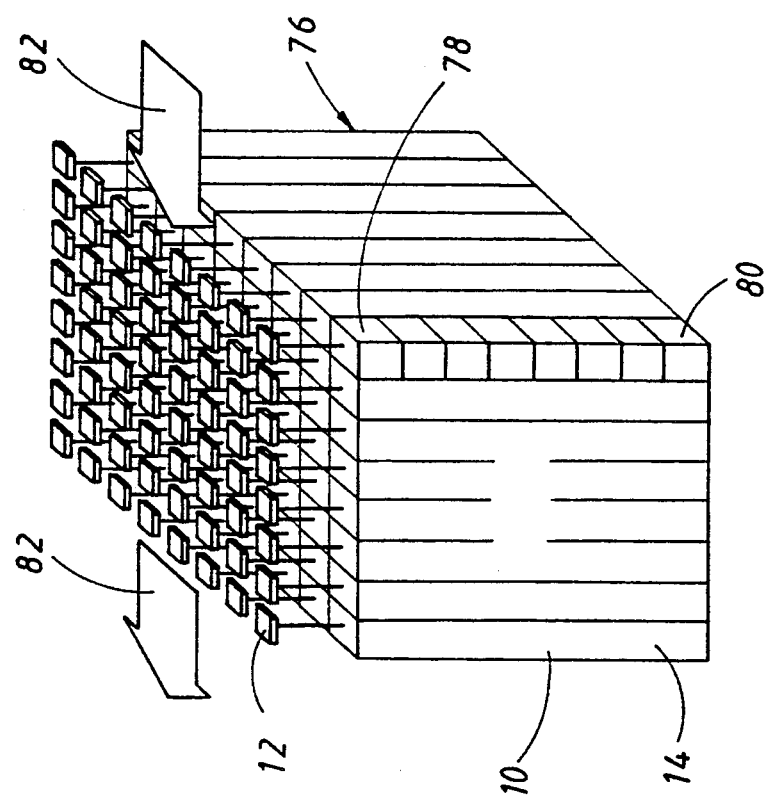
FIG. 6 shows the arrangement of the processor elements in a parallel processor constructed as a binary array processor.

The parallel processor 76 contains sixtyfour individual processor elements 10 of the type illustrated in FIG. 1. The processor elements are arranged in a square matrix. Thus the parallel processor contains eight rows of eight processor elements 10 each. As has already been described with reference to FIG. 1, each processor element 10 contains a processor unit 12 and a local RAM 14. In FIG. 6, each RAM has two hundred and fiftysix storage cells, which are shown here "one above the other" from storage cell 78 of the most significant bit to storage cell 80 of the least significant bit. The processor units comprise a communication register in addition to the processor components proper. The communication register of each processor element is adapted to transfer data from "East" to "West" to the respective adjacent processor element. This transfer is possible also across the borders of the parallel processor 76, which is an integrated circuit component. Therefore, a plurality of such parallel processors can be combined. Each communication register is adapted to directly, bitwise write in data into the associated local RAM and to read out such data from the RAM. The totality of the communication registers forms a "transport layer". The transport layer permits transfer of data in East-West-direction independently of running arithmetic operations. This transport layer is represented by arrows 82 in FIG. 6.

Figure 7:
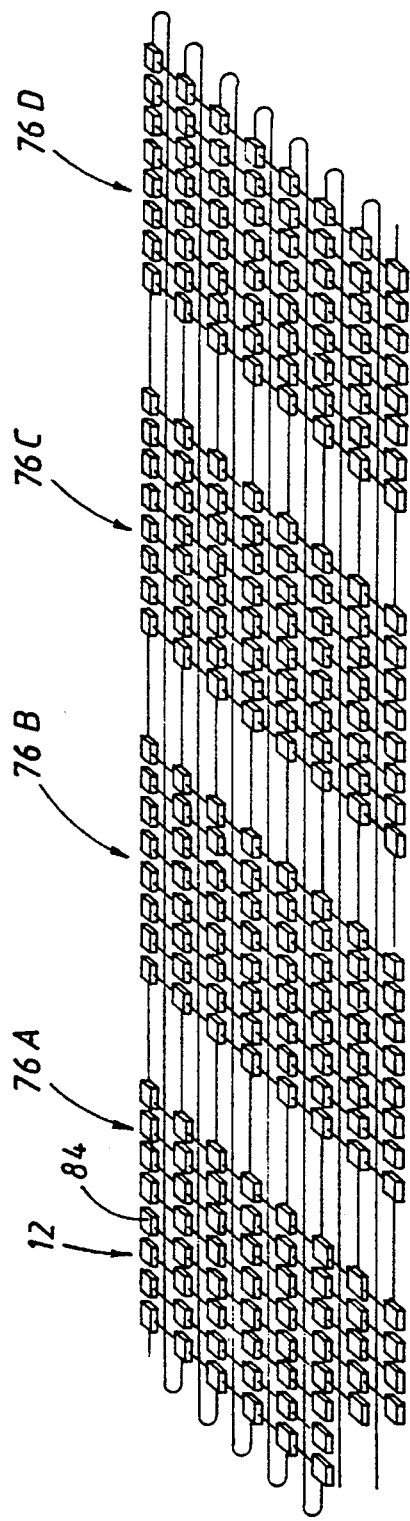
FIG. 7 is a perspective illustration and illustrates the connection pattern of the connections between the processor elements across the borders of the individual modules.

In FIG. 7, four parallel processors of the type illustrated in FIG. 6 are combined. In FIG. 7, the four parallel processors are designated by numerals 76A, 76B, 76C and 76D. In FIG. 7, the processor elements 10 are represented by their respective associated communication register 84. The totality of all communication registers form the transport layer.

The processor units proper 12 are interconnected through bi-direction East-West-connections across the borders of the individual parallel processors 76A, 76B, 76C and 76D. This connection follows a meander-shaped path, whereby a continuous, meander-shaped chain of processor units is provided. These connections are not the connections between the communication registers but signal paths between the calculating registers of the individual processor units 12. Because of this meander-shaped interconnection, a linear structure consisting of two hundred and fiftysix processor elements results for the whole two-dimensional processor. Therein, each processor element has a fixed position number.

Figure 8:
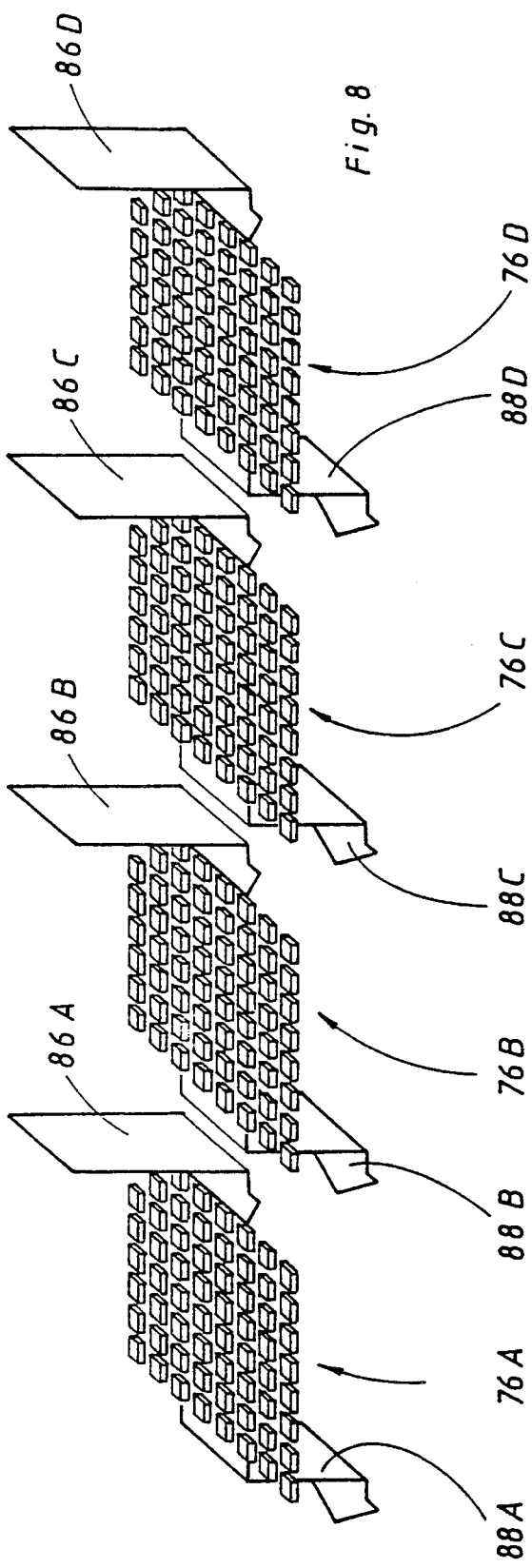
FIG. 8 is a perspective illustration and illustrates the connection pattern of the connections between the communication registers of the parallel processor.

Four input points 86A, 86B, 86C and 86D each having a width of eight bits exist for the inputting of data into the processor. The same is true for the outputting of data. Also here, there are four output points 88A, 88B, 88C and 88D, each having a width of eight bits (FIG. 8). Data which are input into the array of processor elements are supplied through the "East edge". Data which are output from the array of processor elements leave the transport layer through the "West edge". The transport layer consisting of the communication registers can be loaded from the RAMs 14 of the processor elements in one operating cycle only. Eight shift cycles are, however, required to output the sixtyfour bit of the transport layer of a parallel processor unit through the West edge. In similar manner, eight shift cycles are required to load all sixtyfour storage cells of the transport layer with data bits through the East edge, i.e. to build up a bit plane in the transport layer. The "lowering" of this bit plane into the local RAMs 14 again takes place parallelly for all sixtyfour processor elements and, therefore, requires one operating cycle only.

Figure 9:
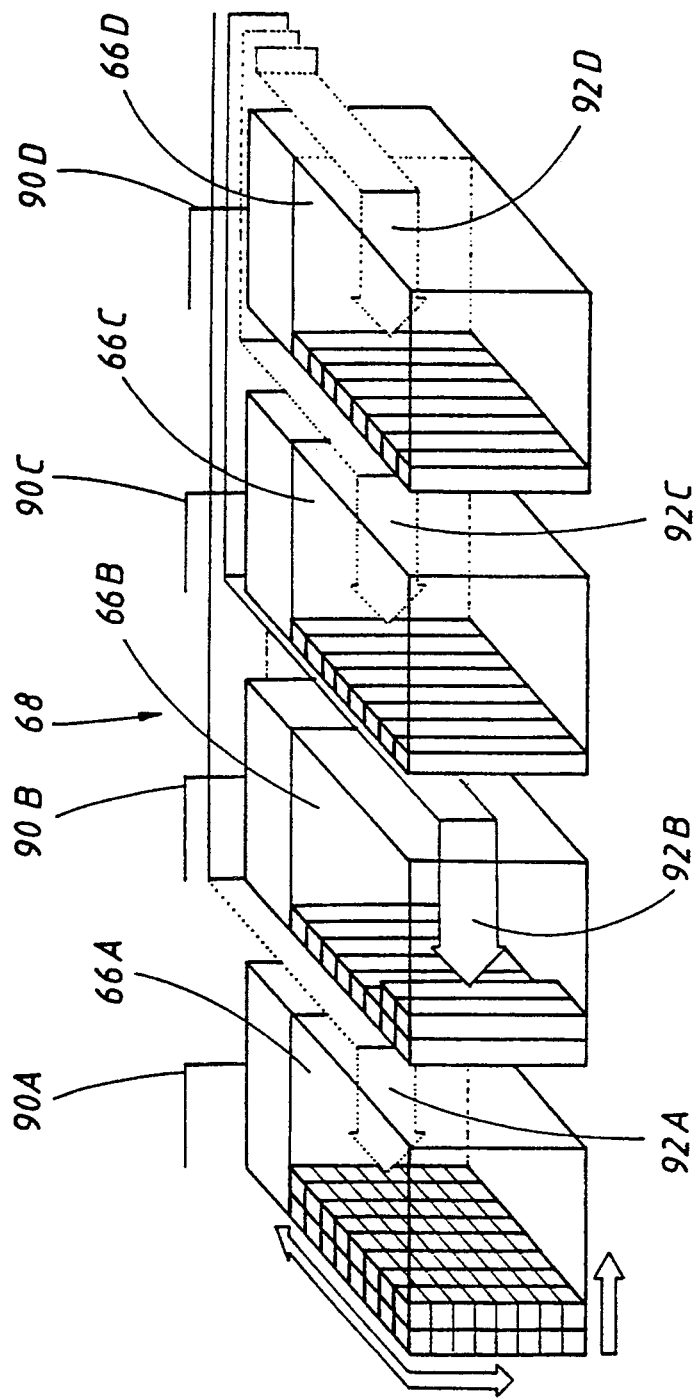
FIG. 9 is a schematic-perspective illustration and illustrates the structure of the input/output interface, when inputting real time data.

The interface has the task of storing two hundred and fiftysix data words of eight bits each, which come in word-serial and bit-parallel, in the memories of the interface such that the data are transferred as efficiently as possible, bit plane-by-bit plane through the communication registers 84 into the RAMs 14 of the processor elements. This is illustrated in FIG. 9.

The interface, which is generally designated by 68, contains four memory blocks 66A, 66B, 66C and 66D. Each of the memory blocks has a storage capacity of 8×32 bytes. The inputting of the data is effected bit-parallelly for eight bits each time. Each memory block 66A, 66B, 66C and 66D has its own write enable line 90A, 90B, 90C and 90D, respectively. Eight address bits are required for inputting the data into the memory blocks 66A, 66B, 66C and 66D: Five address bits address the memory blocks 66A, 66B, 66C and 66D in "x-direction" with the storage cells "0" to "31", three address bits are required for the addressing in the "x-direction" with the layers "0" to "7". No addressing in the "y-direction" is required, as the data are written in with eight data in parallel. For this operation, the four data input points 92A, 92B, 92C and 92D of eight bits each are connected in paralle by an external signal. One of the memory blocks 66A, 66B, 66C and 66D is selected by a control signal on one of the write enable lines 90A, 90B, 90C or 90D, respectively.

Prior to the data loading, the x-address is set to the first "vertical" layer. Thus x is set to x=0. In z-direction the first column is addressed, thus z is set to z=0. For data loading the write enable line 90A of the first memory block 66A is activated. Then the first word of eight bits is stored in it the memory location having the address x=0, z=0. Then the z-address is increased stepwise. This causes consecutively the following seven data words to be stored in the first, "left" layer of memory block 66A up to the address z=7. Then the x-address and the z-address are reset to "0". Instead of the write enable line 90A of the first memory block the write enable line 90B of the second memory block is activated. Now the next eight data are stored in the first, "left" layer of the memory block 66B. In the same way consecutively the first layers of the third and fourth emory blocks 66C and 66D, respectively, are filled up with eight data each up to the word "31". Thereafter, the x-address is increased by one. The write enable line 90A is activated again. With the z-adresses from "0" to "7" the next eight incoming data beginning with the word "32" are stored in the second layer of the first memory block 66A. Then the second memory block 66B of the interface is addressed by energizing the write enable line 90B etc. In the illustration of FIG. 9, the word no. "41" is just being written into the memory block 90B. The described operational sequence is repeated, until all memory blocks 66A, 66B, 66C and 66D are fillled in x-direction with eight "vertically arranged" data layers. This is the case, when the word no. "255" has been written into memory block 66D into the memory location having the x-address "7" and the z-address "7". Then four data blocks in the format of 8×8 bytes are stored in the four memory blocks. Furthermore these data blocks are arranged such that they directly correspond to the "quasi-linear" arrangement of the processor elements 10 in FIG. 7.

Thereby the writing operation for the selected format of the sensor data is terminated.

Figure 10:
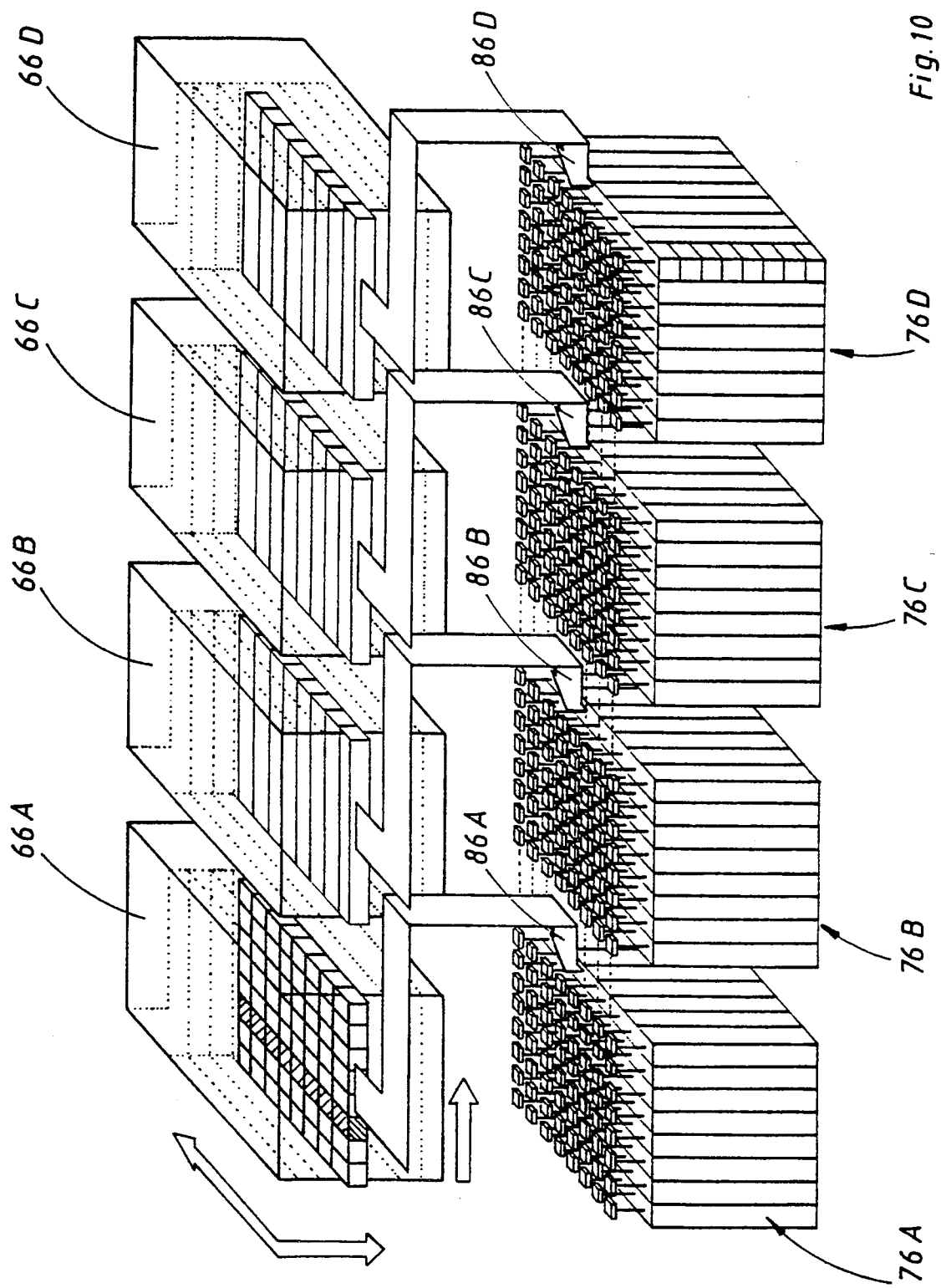
FIG. 10 is a schematic-perspective illustration and illustrates the structure of the input/output interface, when transferring data to an array of processor elements.

As has already been explained, the input/output interface is divided into two memory areas, which can be operated independently of each other. While one of these memory areas is loaded with data from the outside in the manner described above, the respective other one is read out and transfers data to the parallel processor. This read operation also is part of the data input. The structure therefor is shown in FIG. 10.

In contrast to the operating mode "write", wherein "vertically arranged" data columns of eight bit height are written in, "horizontal" bit planes have to be read out with the operating mode "read". To this end, the outputs of the four memory blocks 66A, 66B, 66C and 66D are connected, through a width of eight bits, with the inputs of the transport layer composed of the communication registers 84 of the processor elements 10. This is illustrated in FIG. 10.

For the reading out of the data, the y-adresses are, at first, set to "7". Thereby the bit plane containing the least significant bits is addressed. In x-direction, all eight outputs of each memory block 66A, 66B, 66C, 66D are activated. The write enable lines of all memory blocks 66A, 66B, 66C and 66D are deactivated. Thereby overwriting of data is prevented. The z-address is set to "0". Therefore, the data nos. "0", "32", "64", "96" . . . are presented to the parallel processor module 76A, and the data nos. "8", "40", "72", "104" . . . are presented to the parallel processor module 76B etc. Now with each clock cycle the data presented to the parallel processor modules 76A, 76B, 76C and 76D are loaded through the "East edge" of the transport layer into the communication registers 84 forming this East edge, the data stored in the transport layer in a width of eight bit are shifted by one step from East to West, and the z-address is increased by one.

Accordingly the reading out of the input/output interface during the inputting of data is effected at the clock rate of the parallel processor. Due to the fact that the data structure written in into the input/output interface in the format of 8×8 bytes is identical with the geometrical format of the parallel processor modules 76A, 763, 76C and 76D, and the memory is divided into four memory blocks, only eight clock cycles are sufficient to load the whole information of a bit plane of the input data into the transport layer with the communication registers 84 of the parallel processor. After eight clock cycles, the z-address has reached the state "8", and left the area of valid input data. In the next-following clock cycle the z-address is reset to "0", the y-address is reduced by one and the bit plane written into the transport layer is lowered into the corresponding area of the RAMs 14 of the processor elements 10.

The data outputs remain activated in x-direction across a width of eight bit. Thus the next bit plane is selected and can be tranferred to the transportn layer of the parallel processor in the manner described above. This operational sequence is repeated eight times, until the y-address has reached the state "0" and all valid data have been read out in z-direction. Alltogether $$N_{GES}=8\times(8+1)=72$$

clock cycles are required for the transfer of a data record of the format of 256×8 bit. With an operating frequency of the parallel processor of 16 megacycles, the duration of one clock cycle of the parallel processor is 62.5 ns. Thus only 4.5 μs are required for the described read operation.

When data are output from the parallel processor 76, it is necessary to unload two hundred and fiftysix result variables stored in the parallel processor and having a word length of up to sixteen bit bit plane-by-bit plane through the transport layer formed by the communication registers 84 and to pass them to a subsequent computer unit as a sequence of two hundred fiftysix words of sixteen bit length each. As with the inputting of data, this operation is composed of two suboperations, a write operation and a read operation. These two suboperations are executed in the parallel processor in parallel in two memory areas of the memory of the interface, similar to the inputting of data into the parallel processor already described.

Figure 11:
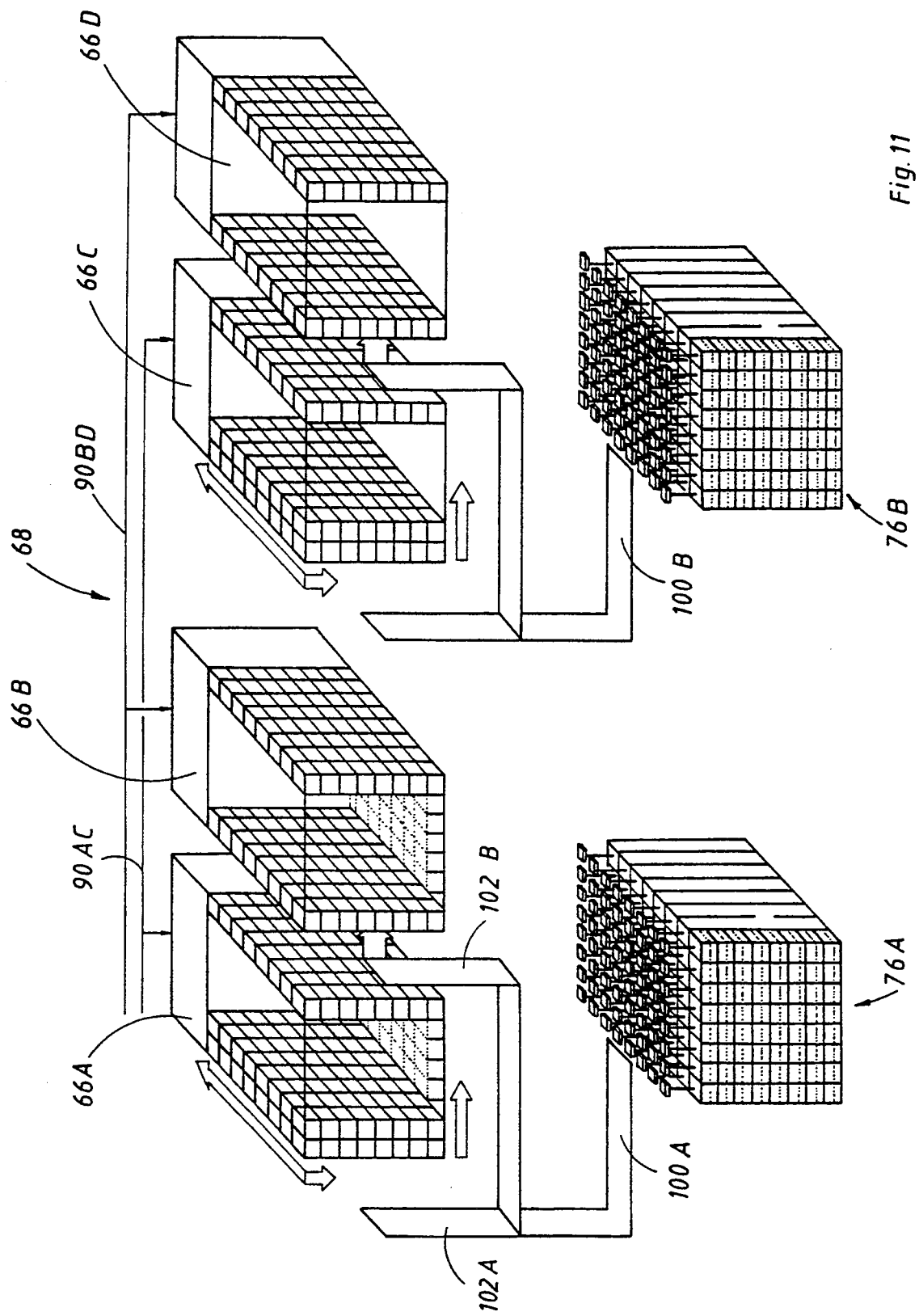
FIG. 11 is a schematic-perspective illustration and illustrates the structure of the input/output interface during the transfer of 16-bit data from an array of processor elements to the interface.

FIG. 11 shows the structure of the interface 68 during the write operation, by which result variables from the parallel processor are written in into the memory of the interface 68.

As data having sixteen bits have to be presented at the output of the interface 68, the data paths of the memory blocks are, however, only eight bit wide, the memory blocks are combined by twos 66A, 66B and 66C, 66D, respectively. This is illustrated in FIG. 11 for the parallel processor modules 76A and 76B. The memory blocks 66A and 66B receive the output data from the parallel processor module 76B. Another input/output interface of the type described has to be provided for receiving the output data from the parallel processor modules 76C and 76D. This is not illustrated in FIG. 11. Accordingly, the output 100A of the parallel processor module 76A is connected in parallel to the inputs 102A and 102B of the memory blocks 66A and 66B. The output 100B of the parallel processor module 768 is connected in parallel to the inputs 102C and 102D of the memory blocks 66C and 66D, respectively.

The reading out of result data from the parallel processor 76 and the writing in of these data into the input/output interface 68 starts with loading a bit plane, e.g. the plane of the least significant bits, into the transport layer composed of the communication registers 84. At the same time, the x-address and the y-address are set to "0". The write enable signals of the memory blocks 66A and 66C are applied through the write enable line 90AC. The least significant bits, for example, of the data nos. "0", "32", "64", "96" . . . are then presented at an output 100A of the parallel processor module.

During the following operations, the input/output interface is controled by the clock of the parallel processor.

With each clock cycle of the parallel processor the following happens:

The data presented at the outputs 100A and 100B with eight bit each are written in, in parallel, into "vertical" storage locations of the memory blocks 66A and 66 C having stepwise changed z-addresses and, at first, the x-address "0".

In the transport layer, the bit plane is transported by one step from East to West, whereby after the first clock cycle the least significant bits of the result variables nos. "1", "33", "65", "97" . . . are presented at the edge of the transport layer at the output 100A.

After eight steps of the z-address, the bit plane of the least significant bits has been transferred from the parallel processor modules 76A and 76B in the format $8 \times 8$ to the respective left "vertical" layer of storage locations of the memory blocks 66A and 66C, respectively.

Thereafter the next bit plane is "lifted" into the transport layer of the parallel processor modules 76A and 76B.

At the same time, the x-address is changed in steps after every eight steps of the z-address, the z-address being reset to "0" prior to each step, and the z-address being again changed stepwise after each step of the x-address with the y-address maintained constant.

This procedure is repeated until eight bit planes of the parallel processor modules 76A and 76B are stored as "vertical" layers in the memory blocks 66A and 66C, respectively.

For the transfer of the next eight bit planes of the result variables in the parallel processor modules 76A and 76B, the write enable signal is removed from the write enable line 90AC and instead a write enable signal is applied through a write enable line 90BD to the memory blocks 66B and 66C. The procedure described above is then repeated. Thereby now the bits planes of the next eight bit up to the most significant bit are transferred to "vertical" layers extending from the front to the rear of the memory blocks 66B and 66D.

In the same way and simultaneously the bit planes of the result variables from the parallel processor modules 76C and 76D are transferred to the second input/output interface (not shown), which is constructed and organized in the same way as the memory blocks 66A, 66B, 66C and 66D.

Thus $$N_{GES} = 16 \times (8 + 1) = 144$$

clock cycles of the parallel processor 76 are required for the transfer of a layer of variables if sixteen bit "thickness" out of the parallel processor 76. With a clock frequency of 16 megacycles and, consequently, a clock cycle of 62.5 ns, a time of 9 $\mu$s results for the transfer of the whole layer of result variables to the memory blocks.

Figure 12:
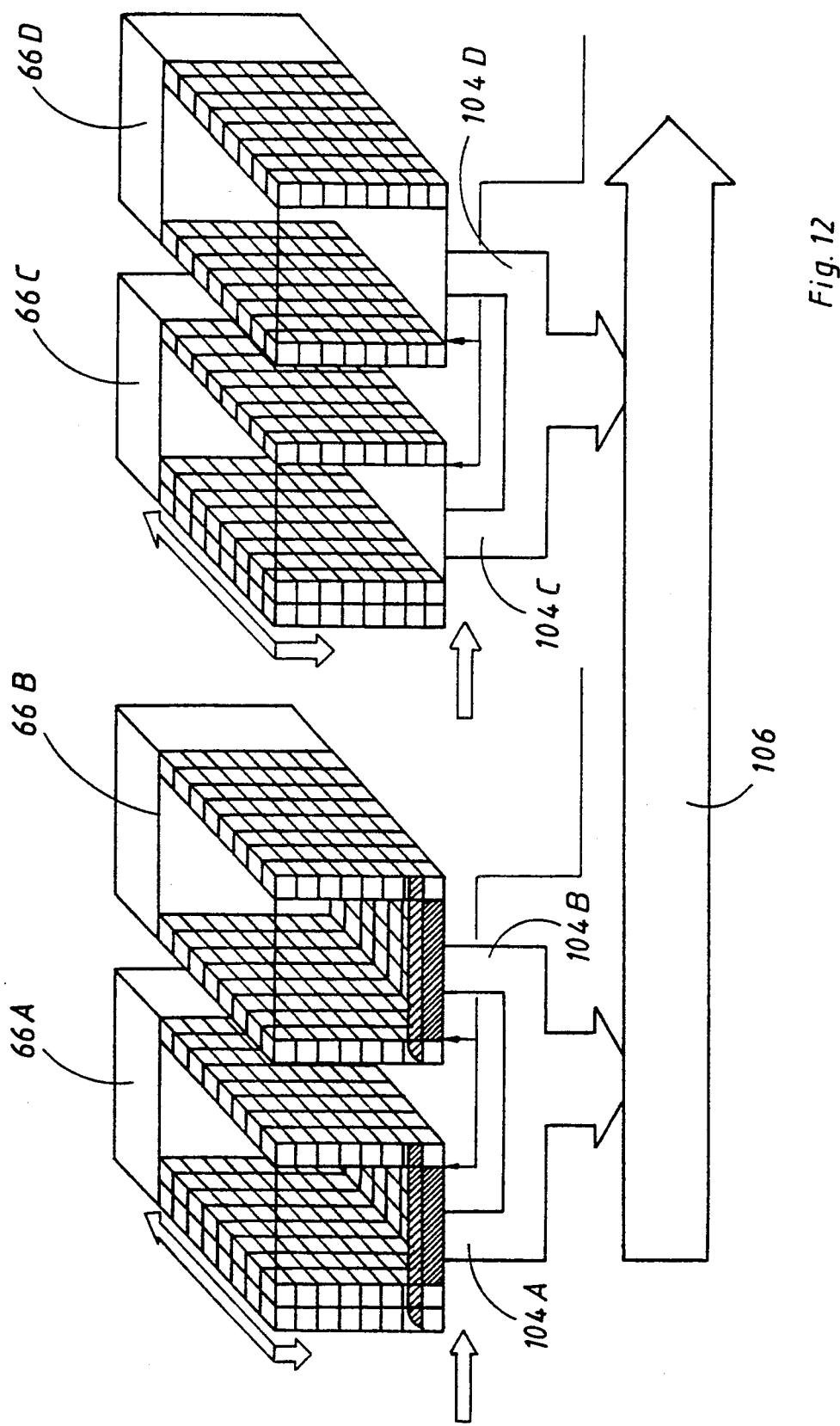
FIG. 12 is a schematic-perspective illustration and illustrates the structure of the input/output interface during the outputting of 16-bit data from the interface.
Figure 13:
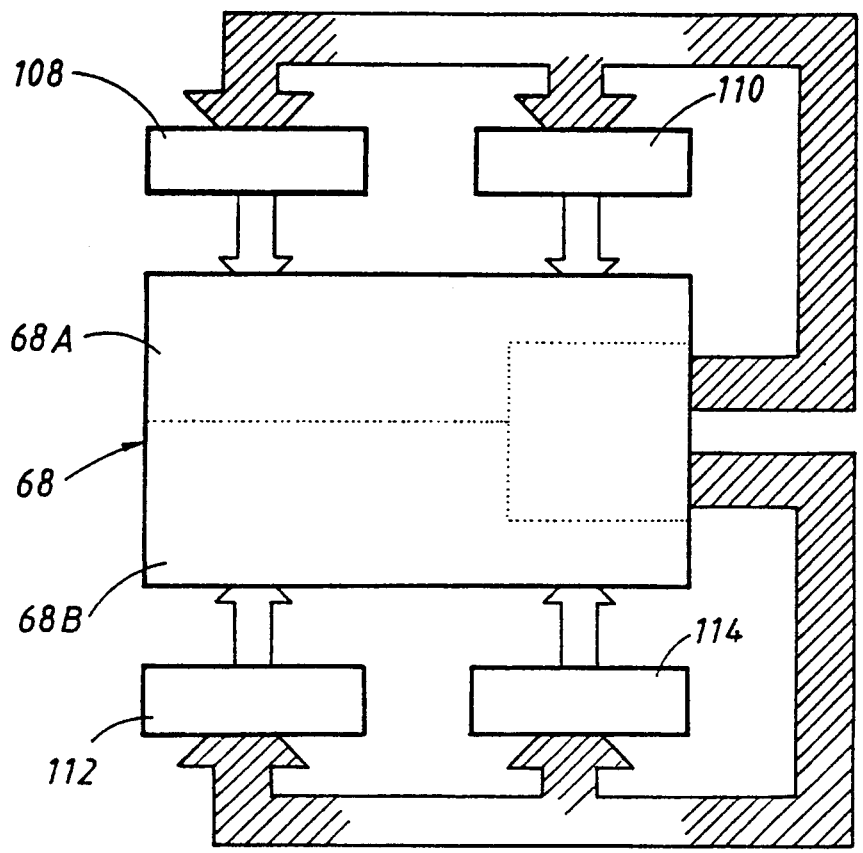
FIG. 13 shows the general structure of the ROM-control of the input/output interface.

Similar to the input of data into the parallel processor, the writing in of the data into the interface is only a suboperation. The data have to be read out of the interface and have to be outputted as a data stream of word-serial and bit-parallel data words of sixteen bit for the further processing. Therefore the interface comprises two memories. One memory is being loaded bit plane-by-bit plane with the result variables from the parallel processor 76 in the manner described with reference to FIG. 11. The respective other memory, in the meantime, outputs the data stored therein bit-parallel and word-serial as data stream of result variables of sixteen bit. FIG. 12 illustrates the outputting of the result variables out of the input/output interface.

During the outputting of the result variables from the memory blocks 66A, 668, 66C and 66D, the write enable lines of all memory blocks are deactivated. This prevents inadvertent overwriting of already stored data. Each of the memory blocks 66A, 668, 66C and 660 has one output 104A, 104B, 104C and 104D, respectively, of eight bit width each. Eight storage cells having a certain y-address and a certain z-address are connected to the outputs 104A, 104B, 104C and 104D. These are the storage cells having is all associated x-addresses. This is a "horizontal column" extending from the left to the right in FIG. 12. In FIG. 12 the storage cells presented at the outputs 104A and 104B for the y-address "0" and the z-address "0" are hatched. The bit-parallel outgoing words of eight bits each at the outputs 104A and 104B are composed of words of sixteen bits on a bus 106 of sixteen bits width. Correspondingly, the words of eight bit each at the outputs 104C and 104D are composed to words of sixteen bits each on the bus 106.

The result variables from the memory blocks 66A, 66B, 66C and 66D are output as follows:

At first, only the outputs 104A and 104B of the memory blocks 66A and 66B are activated.

The y-address and the z-address are set to "0". All x-addresses are addressed.

The words presented at the outputs 104A and 104B are composed to a sixteen-bit word on the bus 106.

The y-address is increased stepwise. The words presented thereby at the outputs 104A and 104B are also composed in pairs on bus 106 to form words of sixteen bit.

After eight words thus formed, when the y-address has become "8", the y-address is reset to "0".

The z-address is increased by one, and then the y-address is again increased stepwise up to "7", and is reset at "8".

This procedure is repeated, until all result variables stored in the memory blocks 66A and 66B have been output on the bus 106 bit-parallel and word-serial. Then the outputs 104C and 104D are activated. The result variables from the two memory blocks are output in the same way.

The control of the input/output interface is effected through ROMs 108, 110, 112 and 114 (FIG. 13), in which control commands are stored. The ROMs 108, 110, 112 and 114 are controlled by a counter of twelve bit. This counter provides the addresses of the control commands which are stored in the ROMs 108, 110, 112 and 114. These control commands are, for example, commands to apply write enable signals or to enable the data outputting and commands for the control of the data paths.

The input/output interface 68 has two identical subareas 68A and 68B. Each of the subareas is under the control of two ROMs 108, 110 and 112, 114, respectively. Each of the subareas is in the position to carry out both the supply of data to a parallel processor and the removal of data from the parallel processor in the manner described above.

The two subareas can be control led in different manner, so that one subarea, for example 68A, is loaded with data in one format and the other subarea, for example 68B, simultaneously outputs data in a different format. The two subareas and the associated microprograms can operate at different clock rates. Data are then received at a first clock rate $D_1$ by subarea 68A, for example, and simultaneously already reformatted data are supplied to the parallel processor 76 at a second clock rate $D_2$. At the same time, during the data removal from the parallel processor, data in word-parallel, bit-serial format are loaded from the parallel processor at a clock rate $D_2$ and are reformatted, reformatted data being outputted at a third data rate $D_3$.

Also other data formats and/or arrangements of a parallel processor can be handled with the described structure.

Each of the memory blocks 66A, 66B, 66C, 66D has a depth of thirtythree memory locations. Therefore, the memory blocks are filled to one fourth only. Therefore, up to 1,024 data may be stored in the memory blocks.

The distribution of the inputted data on the four memory blocks 66A, 66B, 66C and 66D was selected for time reasons. Actually the whole data record could have been stored in one single memory block, for example memory block 66A. Then the remaining memory blocks 66B, 66C, 66D would then be available for the accomodation of the next-following data records. Also smaller data records, for example shorter row formats in picture processing, can be processed with the described input/output interface. Then, however, the form of the array of processor elements 10 of the parallel processor 76 should be brought into conformity with this different row format. Otherwise invalid edge data would occur with neighborhood operations.

Data could be supplied also to different structures of a parallel processor by means of the input/output interface described.

For example it is possible to associate four parallel processor modules with one memory block, such as 66A, and to extend the parallel processor in "North-South"-direction. The remaining three memory blocks 66B, 66C and 66D would then in parallel supply data to three additional rows of parallel processor modules. It is also possible to associate one memory block with two parallel processor modules. Also two input/output interfaces can be operated in series. The eight memory outputs obtained thereby can be associated with eight parallel processor modules, which are interconnected in "East-West"-direction similar to FIG. 7. Such an arrangement would permit a row length of fivehundred and twelve picture elements (pixels).

We claim:

1. An interface for converting bit-parallel and word-serial data patterns into bit-serial and word-parallel data patterns or vice versa, comprising:
   a three-dimensionally organized data memory, each address in said data memory having three components, each component representative of one of each of the three dimensions of the memory;
   means for receiving a preset number of successive sets of parallel bits of data to be stored in memory, the successive sets to be arranged in memory in a preset two dimensional pattern;
   output means for outputting a preset number of successive sets of parallel bits of stored data;
   control means for storing received data in the memory wherein each parallely received bit of data in a set is assigned a memory address having two of the address components the same from bit-to-bit and one of the address components different from bit-to-bit, and for reading data from the memory and supplying it to the output means in the form of successive sets of parallel bits of data wherein each set of parallel bits of data read from the memory has two address components the same from bit-to-bit and one address component different from bit-to-bit, but the address component that is different from bit to bit for the parallel data read from memory is different from the adress component that is different from bit-to-bit in the received data as it was stored in memory.

2. An interface according to claim 1, wherein the data received for storage is in bit-parallel and word-serial format, wherein each successive set of parallel bits of data is a data word and the parallel bits are arranged accordance to the significance of each bit, wherein the preset number of successive data words are arranged into a preset number of sequences of words, wherein one of the components of the memory address represents the significance of a bit, another component of the memory address represents the number of a data word in the preset succession of data words, and another component of the memory address represents the number of the sequence of words in which a word appears, wherein the component of the memory address assigned to the parallel received bits of a word which is not the same from bit-to-bit when stored in the memory is the component representative of the significance of the bit, and wherein when the data is read from the memory, the component that is not the same from bit-to-bit is the component representative of the number of the word is the succession of words.

3. An interface according to claim 2, wherein the control means is operated by a software program.

4. An interface according to claim 1, wherein the interface includes a plurality of data memories and an equal plurality of control means, each control means being associated with a data memory, each control means being separately and simultaneously operable to store data in or read data from its associated memory.

5. An interface according to claim 4, wherein each of the plurality of control means are independently operated by separate software programs.

6. An interface according to claim 5, wherein the separate software programs can operate at different data and clock rates.

7. An interface according to claim 6, wherein the plurality of memories and plurality of control means are two memories and two control means.

8. An interface according to claim 6, wherein the two control means are operable whereby one control means can operate to store data in its associated memory while the other control means can simultaneously operate to read data from its associated memory.

9. An interface according to claim 4, wherein the plurality of memories and plurality of control means are two memories and two control means.

10. An interface according to claim 9, wherein the two control means are operable whereby one control means can operate to store data in its associated memory while the other control means can simultaneously operate to read data from its associated memory.

11. An interface according to claim 1, wherein the data received for storage is in word-serial and bit-parallel format, wherein each successive set of parallel bits of data is made up of bits of a given significance from each word of a sequence of successive data words of a preset succession of data words, wherein one of the components of the memory address represents the significance of a bit, another component of the memory address represents the number of a data word in the preset succession of data words, and another component of the memory address represents the number of the sequence of words in which a word appears, wherein the component of the memory address assigned to the parallel received bits of a word which is not the same from bit-to-bit when stored in the memory is the component representative of the number of the word in the succession of words, and wherein when the data is read from the memory, the component that is not the same from bit-to-bit is the component representative of the significance of the bit.

12. An interface according to claim 11, wherein the control means is operated by a software program.

* * * * *